(12) United States Patent
Durrant et al.

(10) Patent No.: US 10,589,392 B2
(45) Date of Patent: Mar. 17, 2020

(54) FIXTURE FOR HOLDING A COMPLEX-SHAPED PART DURING A MACHINING OPERATION

(71) Applicant: ROLLS-ROYCE plc, London (GB)

(72) Inventors: George Durrant, Matlock (GB); Alistair Buchanan, Pontefract (GB); Christopher P. Gibson, Nottingham (GB)

(73) Assignee: ROLLS-ROYCE plc, London (GB)

( * ) Notice: Subject to any disclaimer, the term of this patent is extended or adjusted under 35 U.S.C. 154(b) by 292 days.

(21) Appl. No.: 15/589,179

(22) Filed: May 8, 2017

(65) Prior Publication Data

US 2017/0334029 A1 Nov. 23, 2017

(30) Foreign Application Priority Data

May 17, 2016 (GB) .................................. 1608639.9

(51) Int. Cl.
- B23Q 3/06 (2006.01)
- B23Q 3/00 (2006.01)
- F01D 5/12 (2006.01)

(52) U.S. Cl.
CPC .............. *B23Q 3/063* (2013.01); *B23Q 3/00* (2013.01); *F01D 5/12* (2013.01); *F05D 2230/10* (2013.01); *F05D 2240/304* (2013.01)

(58) Field of Classification Search
CPC ..... B23Q 3/063; F01D 5/12; F05D 2240/304; F05D 2230/10
See application file for complete search history.

(56) References Cited

U.S. PATENT DOCUMENTS

| | | | |
|---|---|---|---|
| 3,827,965 A * | 8/1974 | Andrews | B23H 3/00 204/297.07 |
| 5,954,464 A | 9/1999 | Dansereau et al. | |
| 2013/0318773 A1 | 12/2013 | Moss | |
| 2014/0191455 A1 | 7/2014 | Marquoin et al. | |
| 2014/0373503 A1 | 12/2014 | Hanlon | |

FOREIGN PATENT DOCUMENTS

| | | |
|---|---|---|
| FR | 2976203 A1 | 12/2012 |
| FR | 2984788 A1 | 6/2013 |
| GB | 2505496 A | 3/2014 |
| JP | H05-4127 A | 1/1993 |

OTHER PUBLICATIONS

Oct. 17, 2017 Search Report issued in European Patent Application No. 17169938.2.
Sep. 14, 2016 Search Report issued with Great Britain Patent Application No. 1608639.9.

* cited by examiner

*Primary Examiner* — Rick K Chang
(74) *Attorney, Agent, or Firm* — Oliff PLC (57) ABSTRACT

A fixture for locating a straight edge of a curved surface of a part and holding the part in a fixed position during performance of a machining operation on the straight edge is described. The fixture includes: one or more supports for seating a convex curved surface of the part, one or more detachable end stops arranged to extend in a plane orthogonal to that in which the supports sit and against which, in use, the straight edge can be aligned, and a clamp arranged, in use, to push the convex curved surface against the supports such that the straight edge contacts the supports without obstruction of the straight edge.

12 Claims, 8 Drawing Sheets

FIG. 9

FIXTURE FOR HOLDING A COMPLEX-SHAPED PART DURING A MACHINING OPERATION

TECHNICAL FIELD

The present invention is concerned with accurate machining of surfaces of a complex shaped part. More particularly, the invention is concerned with a fixture for holding such a part securely in position whilst leaving the surface to be machined accessible. The invention has particular application (but is not strictly limited to) the machining of trailing edges of aerofoils, for example turbine blades.

BACKGROUND TO THE INVENTION

In the turbine stages of a gas turbine engine there are considerable efficiency losses associated with the aerodynamics of the trailing edges of the aerofoils. It is known that these losses can be greatly reduced if the trailing edge can be made consistently with a thinner profile, which improves the turbine efficiency and therefore decreases the specific fuel consumption.

Turbine aerofoil components are conventionally manufactured by an investment casting process. This process inherently has limits on how thin sections can be cast due to surface tension effects. Typically, the smallest trailing edge thickness which can be reliably cast using the process is around 0.6 mm. To reliably manufacture trailing edge thicknesses of less than 0.6 mm it is desirable to carry out an operation such as machining of the cast component. To preserve the aerodynamic properties of the convex surface of the aerofoil it is further desirable that the material is removed from the concave surface during the thinning operation.

It is known to use fully adaptive machining processes to thin the trailing edge of the cast aerofoil. One example of such an adaptive machining process is disclosed US patent application publication no. US2014/373503A. Such processes are very effective, but very expensive adding significantly to unit cost of manufacture.

Fixtures for holding aerofoils during machining processes are known. For example, a 6 point location nest is described in US patent application publication no. US2014/191455A. Whilst such arrangements can secure a part, they do not align a trailing edge for accurate machining with respect to the suction surface of the aerofoil. Also, these known arrangements do not provide unencumbered access to a machine tool along the entire length of the trailing edge.

Another example of a known fixture arrangement is described in the applicant's own US patent application publication US2013318773A. Whilst the described arrangement allows good access to the trailing edge, the arrangement does not provide for accurate alignment of the trailing edge for machining by a conventional machine tool, an accurate result would require an adaptive machining solution.

The invention seeks to provide a fixture which sets a cast aerofoil in an orientation which is suitable for machining by a direct machining process such as milling.

SUMMARY OF THE INVENTION

In accordance with the present invention there is provided fixture for locating a straight edge of a curved surface of a part and holding the part in a fixed position during performance of a machining operation on the concave side surface adjacent the straight edge, the tooling comprising;

One or more supports for seating a convex curved surface of the part, one or more detachable end stops arranged to extend in a plane orthogonal to that in which the support(s) sit and against which, in use, the straight edge can be aligned, a clamp arranged, in use, to push the convex curved surface against the support(s) such that the straight edge contacts the support(s) without obstruction of the concave side surface adjacent the straight edge.

In use, a convex surface of the part is laid against the supports and tilted such that the straight edge lies against the support(s). The detachable end stops are positioned in the orthogonal plane and the straight edge is slid along the support until the straight edge is aligned with the end stops. With the straight edge in the desired position, the clamp is applied to hold the part in the desired position. The detachable end stops may then be removed exposing the concave side edge surface for machining.

Desirably, the support includes two or more spaced ribs. For example, the ribs are in the form of two or more rods in parallel alignment. Alternatively, the support comprises a base onto which are integrally formed two or more protruding ribs. The ribs may have a rounded cross section. Alternatively the ribs may present an angled edge to the convex surface. Alternatively, the ribs may present a narrow flat surface to the convex surface.

In another option, the support comprises a base with two or more spaced rows of protrusions, for example semi-spherical protrusions on to which the convex surface can be seated.

The detachable end stop may comprise a flat plate. Alternatively, the end stop comprises two or more spaced apart rods. The rods may have a rounded cross section. Alternatively the rods may present an angled edge to the straight edge of the part. Alternatively, the rods may present a narrow flat surface to the straight edge.

The fixture may further comprise a convex surface counter-support for countering any undesirable load from the clamp which may cause slippage and/or tilting of the part after it has been positioned. The counter support may, for example, comprise a wedge or a bar whose position is slidably adjustable to accommodate various degrees of curvature. The counter-support may comprise part of the clamp. The counter-support may comprise part of the support.

The clamp and the counter support may comprise a pivoted clamp, for example centrally pivoted.

The fixture may further comprise one or more additional stops arranged in a third plane orthogonal to both the plane in which the support(s) sits, to control the location of the blade in the direction of which the detachable end stops extend The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments of the invention will now be further described with reference to the accompanying Figures in which.

DETAILED DESCRIPTION OF DRAWINGS AND SOME EMBODIMENTS

Figure 1:
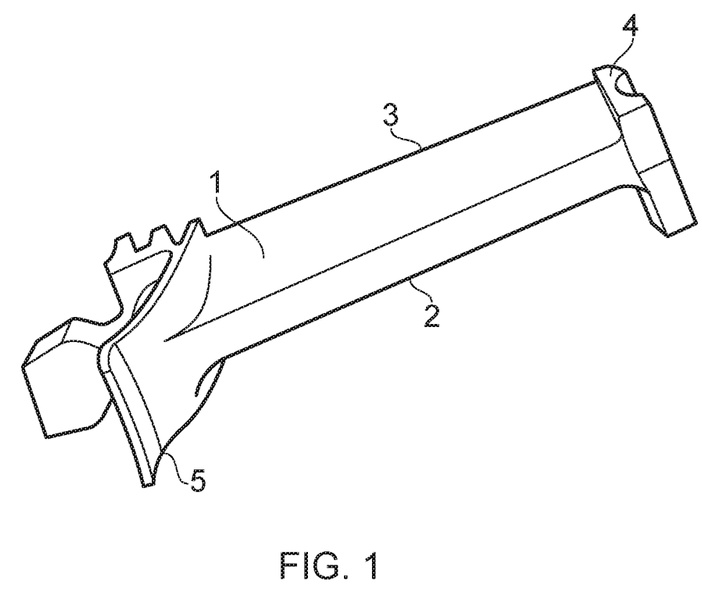
FIG. 1 shows a cast turbine blade having a curved surface and a straight trailing edge of the surface.
Figure 2:
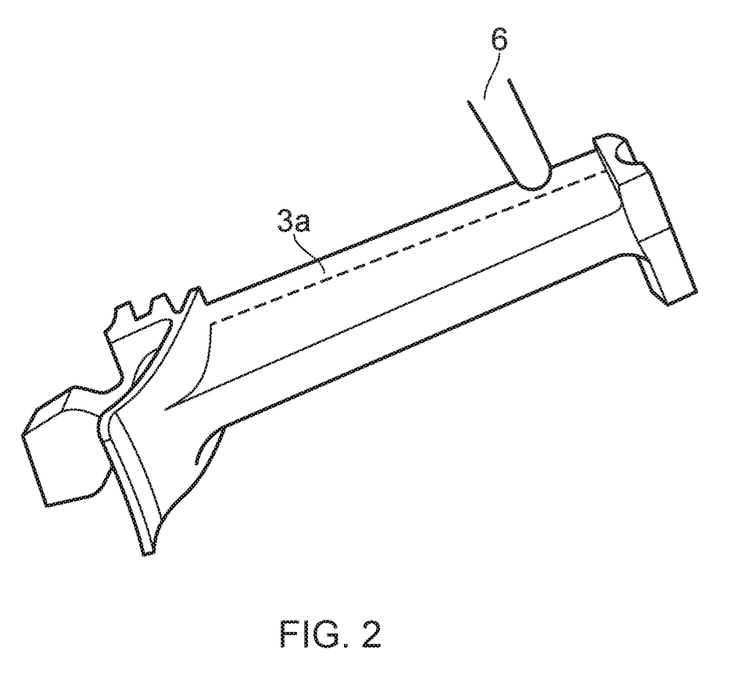
FIG. 2 illustrates how the turbine blade of FIG. 1 might be machined to provide a thinner trailing edge for a more aerodynamic performance.

As can be seen the blade of FIG. 1 has a concave surface 1 on an opposite face to a convex surface 2. The two surfaces 1, 2 meet at a trailing edge 3. The blade has a tip platform 4 and a root platform 5. FIG. 2 shows the blade of FIG. 1 in the process of having a surface of the trailing edge 3a machined by a tool 6. For example, the machine tool 6 may be of a milling or grinding machine.

Figure 3:
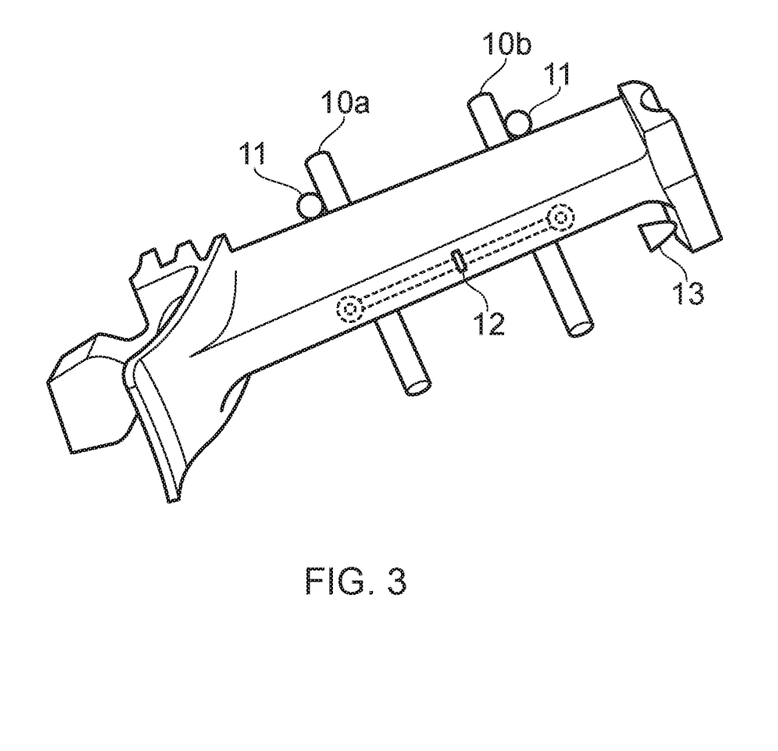
FIG. 3 shows a view from a leading edge of the turbine blade of FIG. 1 arranged in tooling in accordance with a first embodiment of the invention.

FIG. 3 shows the blade of FIG. 1 arranged in a fixture according to an embodiment of the invention. As can be seen, the fixture comprises a pair of support bars 10a, 10b onto which the convex surface 2 of the blade is seated. Extending in an orthogonal plane is a pair of detachable end stops in the form of rods 11. The trailing edge 3 of the blade is aligned against the end stops 11. Desirably, the convex surface 2 adjacent the trailing edge 3 is positioned flat against the supports 10a, 10b. This may be facilitated by means of a pivoted convex surface support 12. The tooling may further include a stop 13 in a third orthogonal direction against which the tip platform is aligned. In alternatives, the position of this stop could be on the opposite face of the tip platform 4, or on either face of the root platform 5. The stop 13 may be fixedly connected to a frame which also comprises the support bars 10a, 10b.

Figure 4:
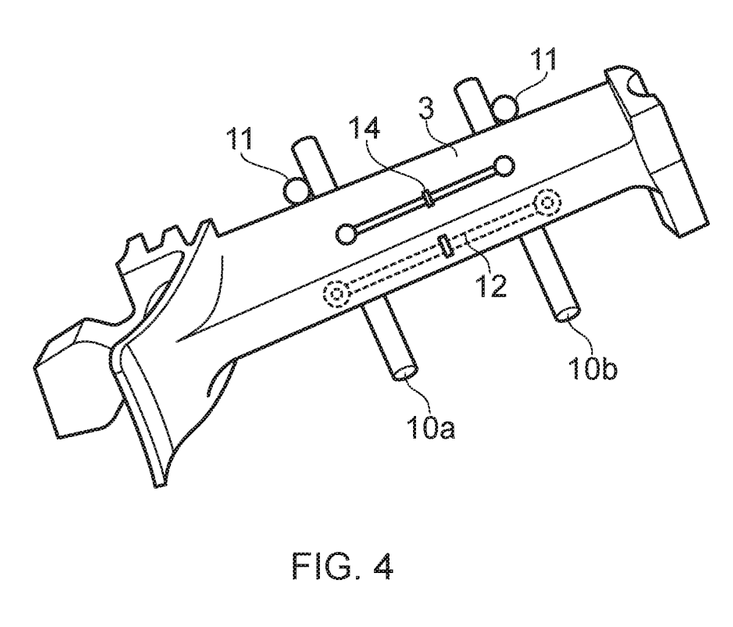
FIG. 4 shows the arrangement of FIG. 3 with the blade clamped in the desired position and orientation.

As can be seen in FIG. 4, once the trailing edge 3 is aligned with the detachable rods 11, the blade is secured in position by a pivoted clamp 14. The pivoted convex surface support 12 serves to counter any load from the clamp 14 which might push the trailing edge out of alignment with the rods 10a and 10b. This is better illustrated with the schematic cross-sectional view of the blade in FIG. 5.

Figure 5:
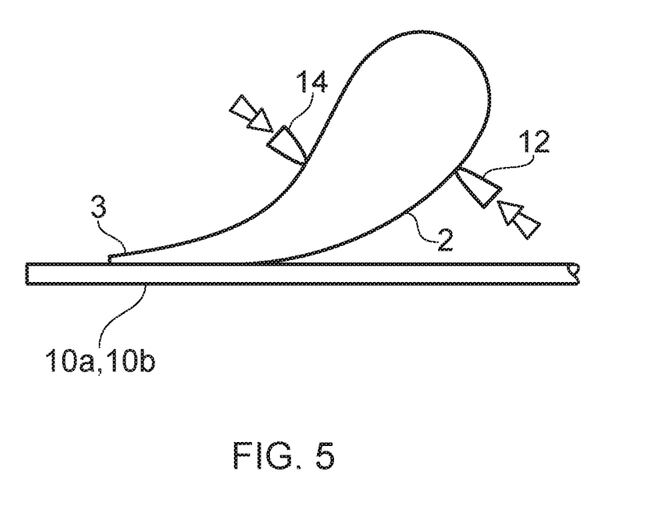
FIG. 5 shows points at which the concave and convex surfaces of the blade of FIG. 4 are supported.
Figure 6:
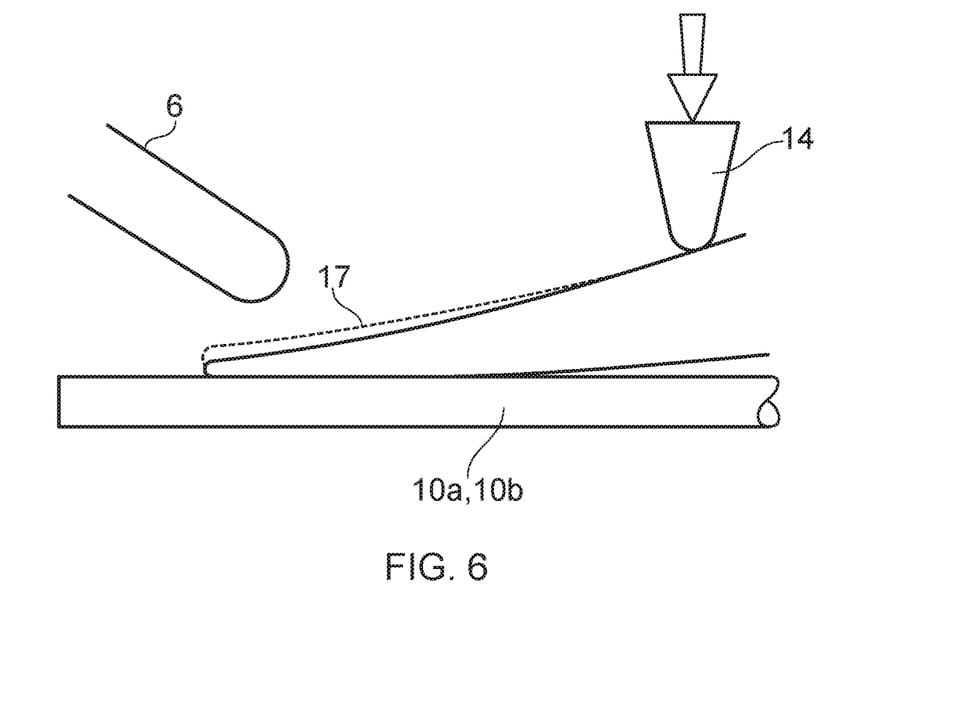
FIG. 6 shows material being removed from the trailing edge of a blade aligned and held using tooling in accordance with an embodiment of the invention.

In the fixture shown in FIGS. 4 and 5, the centrally pivoted clamp 14, is located approximately ⅓ of the way along the chordal length of the blade from the trailing edge 3 to the leading edge. This clamp 14 acts on the concave surface to force the part firmly against the supports 10a, 10b and the centrally pivoted counter-support 12, but without excessive force so as to cause distortion of the trailing edge. The blade is thus firmly gripped as a result of the reactionary forces from the clamp 14, the supports 10a, 10b and the centrally pivoted convex support 12. The trailing edge end stops 11 can now be retracted (e.g. vertically) away from the remainder of the tooling to allow access for the cutting tool 6 as shown in FIGS. 2 and 6. It is important to note that the detail of the tooling design will depend on the specific geometry of the part to be machined, and in particular the relative distances and angles between the clamp 14 and the counter-support 12 and the trailing edge supports 10a and 10b, to ensure that the part is held firmly in position during the machining operation. Following clamping of the part and retraction of the trailing edge stops 11, the trailing edge 3 can be machined along the concave surface side of the trailing edge to form the desired thinner trailing edge profile. To ensure an accurate trailing edge profile is generated, a measurement process, such as a scanning probe or a laser system, may be used to measure the trailing edge thickness from the tip platform 4 to the root platform 5, or visa-versa, to make allowances for any part distortion, such as trailing edge bow, during the machining operation.

Figure 8:
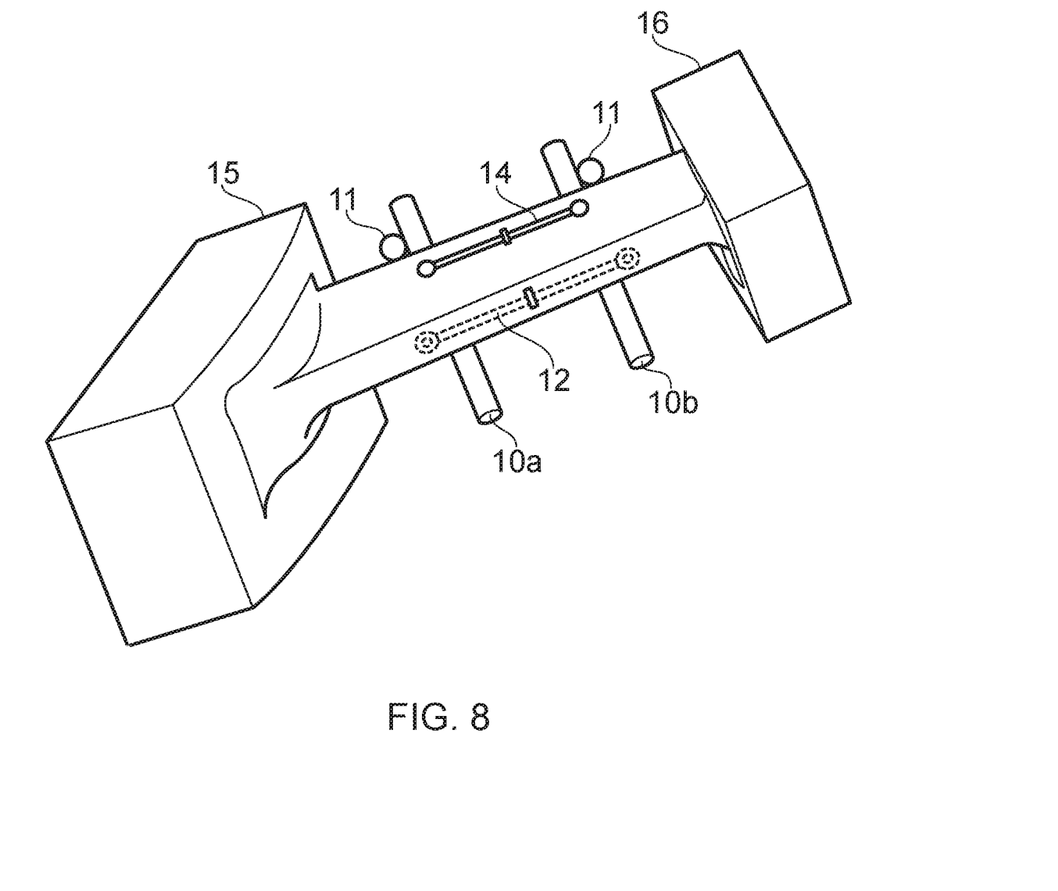
FIG. 8 illustrates a second embodiment of tooling in accordance with the invention applied to a blade which is the same as the blade of FIG. 1.

In an alternative embodiment as shown in FIG. 8, the tip and root platforms 4, 5 of the blade are supported in compliant gripping fixtures 15, 16. The compliant gripping fixtures may be rotated and locked into position once the convex surface adjacent the trailing edge is in contact with the support bars 10a, 10b and the detachable end stops 11. Before the gripping fixtures 15, 16 are locked in position the clamp 14 (which in this embodiment is positioned closer to the trailing edge 3) pushes the convex surface intimately against the supports 10a, 10b. With the blade properly positioned for subsequent machining, the compliant gripping fixtures 15, 16 are locked to maintain the position and the clamp 14 can be removed providing access to the concave side trailing edge for machining.

In this embodiment, the clamp 14 can be dispensed with once compliant gripping fixtures 15, 16 have been locked in position. For example, in FIG. 7, the clamp 14 is arranged such that there is negligible force in a plane parallel to the support bars 10a, 10b. Thus, the position of the blade can be maintained whilst compliant gripping fixtures 15, 16 are locked in position.

Figure 9:
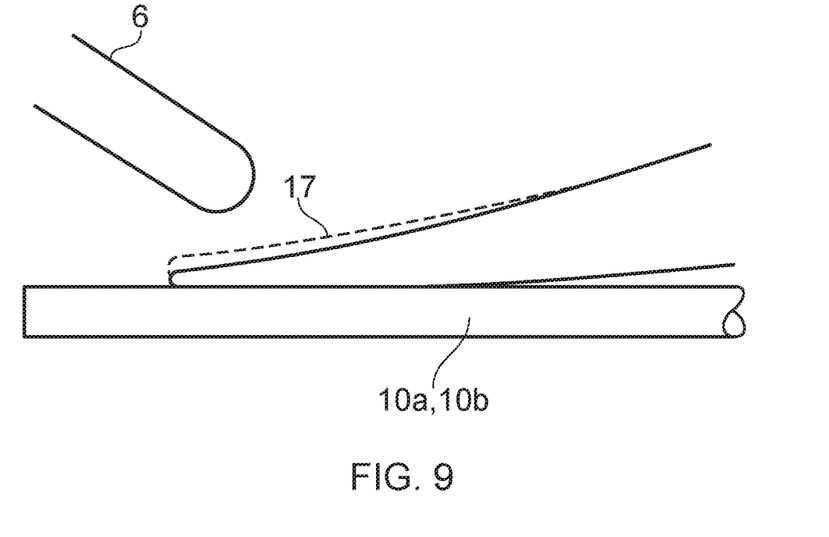
FIG. 9 illustrates a second embodiment of the tooling with the clamp shown in FIGS. 7 and 8 removed

As can be seen in FIG. 9, once the blade has been positioned and secured into position, the detachable rods 11 are removed allowing a machine tool 6 to remove material 17 from the trailing edge on the concave surface side.

Figure 7:
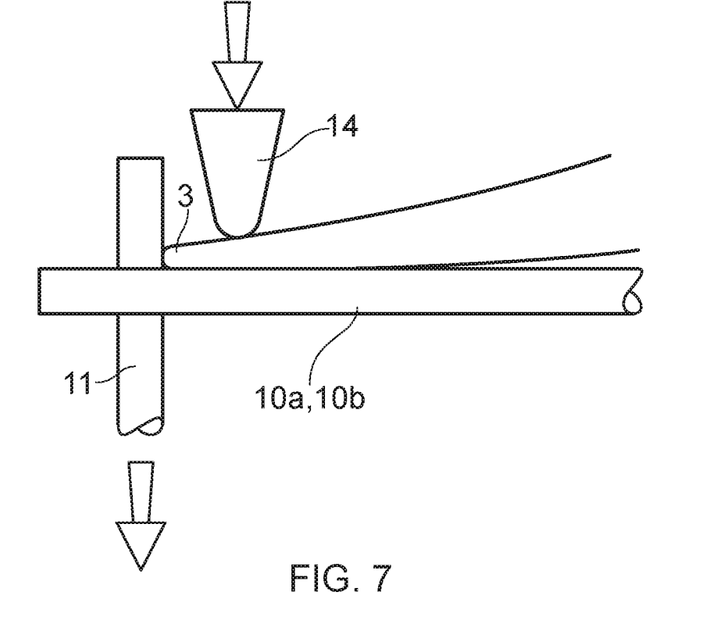
FIG. 7 shows the loading applied to the blade by the clamp of the tooling of FIG. 8.

In the tooling arrangement shown in FIGS. 7 and 8 the centrally pivoted clamp 14 is positioned much closer to the apex of the trailing edge 3. This allows the trailing edge to be located more intimately against the supports 10a, 10b, thereby improving the accuracy of the setting and thus the final profile of the trailing edge. With this arrangement, the blade is clamped in position after it has been appropriately positioned and oriented. As an alternative to the counter support 12 of the previously described embodiment, the compliant gripping fixtures 15, 16 can be arranged to hold a platform 4, 5 of the blade in a given orientation. Once the blade and compliant gripping fixtures 15, 16 are in the desired position and orientation, the ends of the fixtures 15, 16 are firmly clamped. The end stops 11 and clamp 14 are retracted away from the trailing edge 3 to allow access for the cutting tool 6 to machine the trailing edge 3. The material removal 17 is carried out relative to the datum system of the tool, in particular the supports 10a, 10b and the position of the trailing edge end stops 11 (prior to their removal).

The invention claimed is:

1. A fixture for locating a straight edge of a curved surface of an aerofoil and holding the aerofoil in a fixed position during performance of a machining operation on a concave side surface adjacent the straight edge of the curved surface of the aerofoil, the fixture comprising;

two or more elongate and spaced apart supports configured to form a seat for the convex curved surface of the aerofoil, each elongate support extending straightly and in parallel with the straight edge of the curved surface, which is parallel with a chord of the convex curved surface, two or more detachable end stops arranged to extend in a plane orthogonal to that in which the elongate supports extend and against which, in use, the straight edge of the curved surface of the aerofoil is aligned, and a clamp arranged, in use, to push the convex curved surface of the aerofoil against the elongate supports such that the straight edge of the curved surface of the aerofoil contacts the elongate supports and upon removal of the detachable end stops the concave side surface adjacent the straight edge is exposed for machining.

2. The fixture as claimed in claim 1 wherein the supports comprise two or more spaced ribs.

3. The fixture as claimed in claim 2 wherein the ribs comprise two or more rods in parallel alignment.

4. The fixture as claimed in claim 2 wherein the supports comprises a base onto which are integrally formed the two or more protruding ribs.

5. The fixture as claimed in claim 2 wherein the ribs have a rounded cross section.

6. The fixture as claimed in claim 1 wherein the detachable end stop comprises two or more spaced apart rods.

7. The fixture as claimed in claim 6 wherein the rods have a rounded cross section.

8. The fixture as claimed in claim 1 wherein the clamp comprises a pivoted clamp.

9. The fixture as claimed in claim 8 wherein the clamp is centrally pivoted.

10. The fixture as claimed in claim 1 further comprising a convex surface counter-support for countering any undesirable load from the clamp which may cause slippage and/or tilting of the part after it has been positioned.

11. The fixture as claimed in claim 10 wherein the counter support comprises a wedge or a bar whose position is slidably adjustable to accommodate various degrees of curvature.

12. The fixture as claimed in claim 10 wherein the counter-support comprises a pivoted support.

* * * * *